Figure 1:
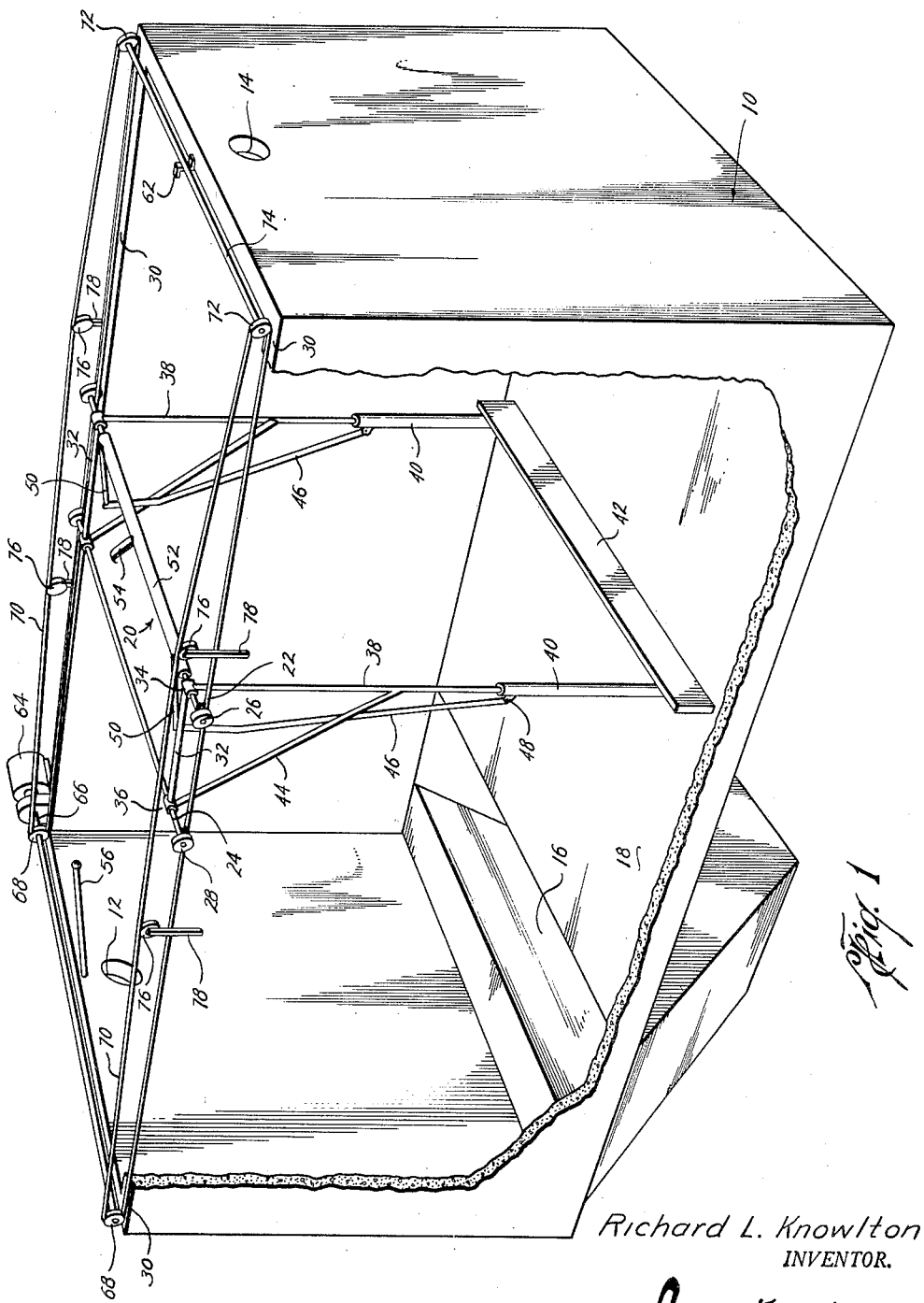

Nov. 24, 1953 R. L. KNOWLTON 2,660,557
APPARATUS FOR REMOVING SOLIDS FROM LIQUIDS
IN SETTLING TANKS AND THE LIKE
Filed April 16, 1952 3 Sheets-Sheet 1

Richard L. Knowlton
INVENTOR.

BY James F. Weiler

ATTORNEY

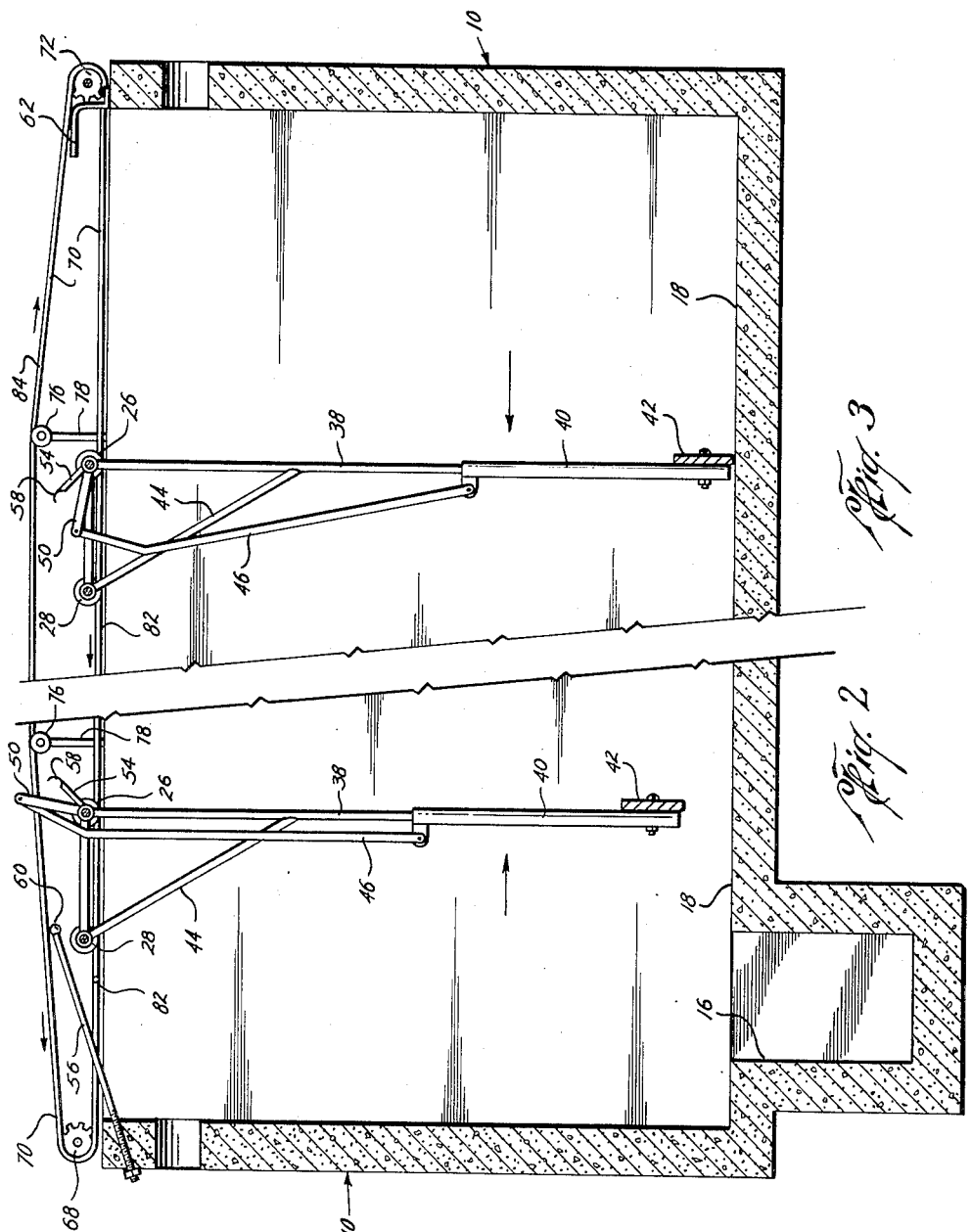

Nov. 24, 1953 R. L. KNOWLTON 2,660,557
APPARATUS FOR REMOVING SOLIDS FROM LIQUIDS
IN SETTLING TANKS AND THE LIKE
Filed April 16, 1952 3 Sheets-Sheet 3
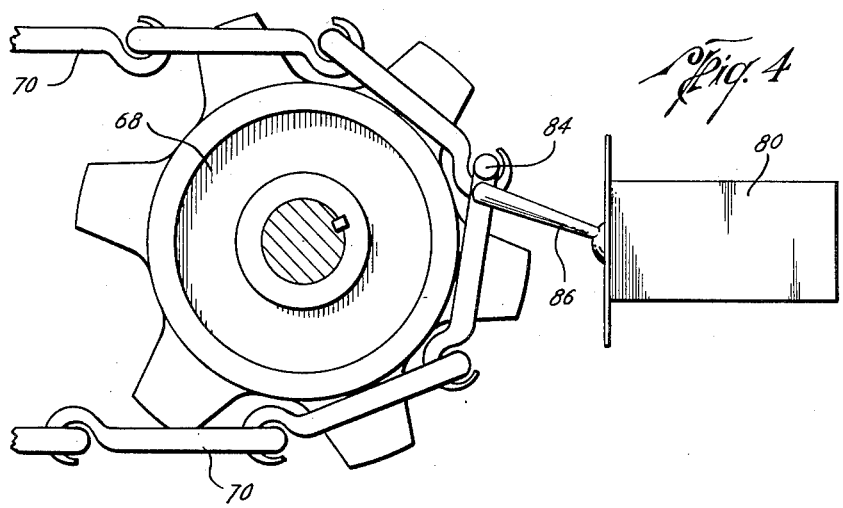
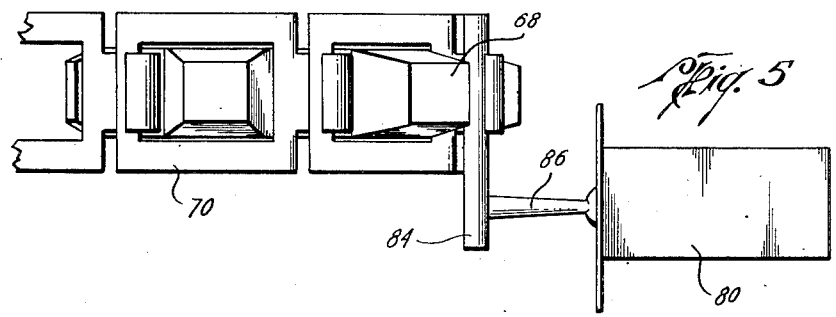
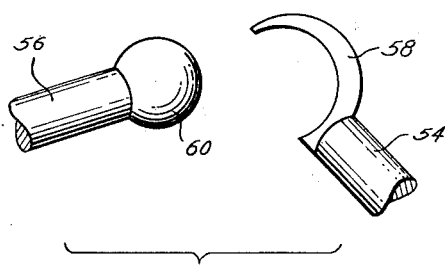
Richard L. Knowlton
INVENTOR.
BY James F. Weiler
ATTORNEY Patented Nov. 24, 1953

2,660,557

UNITED STATES PATENT OFFICE 2,660,557

APPARATUS FOR REMOVING SOLIDS FROM LIQUIDS IN SETTLING TANKS AND THE LIKE

Richard L. Knowlton, Fort Worth, Tex., assignor to Texas A. & M. Research Foundation, College Station, Brazos County, Tex., a private corporation Application April 16, 1952, Serial No. 282,660

8 Claims. (Cl. 210—3)

This invention relates to apparatus for removing solids from liquids and, more particularly, for removing solids from liquids in settling or sedimentation tanks and the like.

Apparatus of this character have wide commercial application, especially in the field of sanitation and sewerage, and in the various chemical, petroleum, metallurgical and other industries, as well as in various fields of research.

In using apparatus of this character commercially, it is desirable to provide an apparatus for removing solids from liquids in settling or sedimentation tanks and the like, which apparatus periodically scrapes the floor or solid collecting surface of the tank, which is simple and economic of operation, which will not cause undue agitation of settled solids and which is automatic in operation. It is also desirable to provide an apparatus of this character which may readily be adapted and adjusted for use in settling and sedimentation tanks of widely varied shape and size, and in tanks which may be varied in size and shape, for example, in research work, in which a minimum of parts of varying dimensions may be replaced in making the adjustment. Moreover, it is extremely desirable to provide such an apparatus in which the means to drive the carriage and scraper flight is located so that it does not pass through the material being settled thereby eliminating troublesome corrosion problems. Additionally, it is desirable to provide such an apparatus which may be easily and readily repaired and which apparatus or its parts may be removed and repaired without draining the basin to which it is attached.

It is also desirable to provide an apparatus of this character which is readily and easily adapted for use with basins or tanks originally designed for manual cleaning, which condition exists in many water and other treating plants, thereby enhancing the possibilities of converting certain septic tanks to sedimentation basins with a minimum of structural changes.

Accordingly, it is among the objects of the present invention to provide an apparatus for removing solids from liquids in settling or sedimentation tanks and the like which is simple of construction and economic to make, operate and maintain.

A further and important object of the present invention is the provision of an apparatus of this character which is readily and easily adapted for use in tanks, basins and the like of widely varied size and shape, and which apparatus may be adjusted by replacing or substituting a minimum of parts.

Yet a further and important object of the present invention is the provision of an apparatus of this character in which the driving means for the scraper is located so that it does not pass through the material being settled thereby avoiding troublesome corrosion problems.

A still further and important object of the present invention is the provision of an apparatus of this character in which a portion of or the entire apparatus may readily be removed for making repairs, replacements or adjustments without draining the tank or basin in which it is operating.

A further object of the present invention is the provision of apparatus for removing solids from liquids in settling or sedimentation tanks and the like, which reciprocates along the tank, the scraper flight being in a lowered position and scraping the bottom or solid collecting surface of the tank while moving in one direction, and being elevated when moving in the other direction to avoid agitation of the solids.

A further object of the present invention is the provision of such an apparatus which is automatic in operation.

Other and further objects will be apparent from the following description of one form of the invention, given as an example for the purpose of disclosure, taken in connection with the accompanying drawings, in which like character references designate like parts throughout the several views, and where Fig. 1 is a perspective view, with parts broken away, illustrating apparatus for removing solids from liquids in settling or sedimentation tanks and the like constructed in accordance with the invention and shown in scraping position, Figs. 2 and 3 are fragmentary longitudinal sections of the apparatus illustrated in Fig. 1, Fig. 2 illustrating the apparatus when the scraper is elevated and Fig. 3 illustrating such apparatus when the scraper is in scraping position, Fig. 4 is a fragmentary detail illustrating a suitable drive arrangement and a reversing arrangement therefor to provide reciprocation for the apparatus along a settling or sedimentation tank or like structure, Fig. 5 is a plan view of the structure illustrated in Fig. 4, and Fig. 6 illustrates suitable engaging structure in connection with elevating the scraper flight.

In general, an apparatus constructed according to the present invention includes a carriage reciprocable along a settling or sedimentation tank or like structure, which carriage carries a depending scraper flight which may be elevated away from or lowered to engage the bottom or solid collecting surface of the tank or like structure. Means are provided to raise and lower the scraper flight so that when the carriage is moving in one direction, the scraper flight is elevated and when moving in the other direction the scraper flight is lowered to scrape solids on the solid collecting surface or bottom. Means may also be provided for automatically reciprocating the carriage along the tank.

Referring to Fig. 1, the reference numeral 10 designates a settling or sedimentation tank particularly adapted for use in sewerage disposal apparatus, although it is understood that the apparatus of the present invention may have a general and widespread commercial application. An inlet port 12 is provided at one end of the tank 10 for the influent mixture of the liquid and solids, and an outlet port 14 is provided at the opposite end for the flow of effluent from the tank 10. The influent port 12 is illustrated as being substantially over the sump or sludge hopper 16 disposed at one end of the bottom or solid collecting surface 18 of the tank 10. Thus, the heavier solids upon entering the influent port 12 will immediately settle into the sump or sludge hopper 16, although it will be understood that the influent and effluent ports may be reversed or any desired arrangement of influent and effluent ports and hopper may be used.

Reciprocable along the tank 10 is a carriage generally indicated by the reference numeral 20, which includes a main axle 22 and a forward axle 24 to each end of which are secured the rollers 26 and 28, respectively. The carriage thus moves back and forth or reciprocates by means of the spaced rollers 26 and 28 rolling on the upper surface 30 of the walls of the tank 10.

The axles 22 and 24 are rigidly secured together by means of the spaced arms 32 secured to the bushings 34 and 36 through which the axles 22 and 24, respectively, are journaled.

Extending downwardly from the carriage 20 and, as illustrated, from the bushings 34 are a pair of spaced upper carrier arms 38, to which at their lower ends the lower carrier arms 40 are slideably secured. The lower carrier arms 40 may be secured to the upper carrier arms 38 in any preferred manner to provide longitudinal sliding therewith and, as illustrated, telescoping the arms 38 and 40 is satisfactory.

Secured to the lower portion of the lower carrier arms 40 is a scraper flight which engages and scrapes the bottom or solid collecting surface 18 of the tank 10 and which, preferably, extends laterally across the tank.

The upper carrier arms 38 are linked to the forward axle 24 by means of the linking arms 44 extending from the upper carrier arms 38 to the bushings 36 in which the forward axle 24 is journaled. Thus, the carriage is reciprocal along the tank and carries the scraper flight 42.

As illustrated in Fig. 1, the scraper flight 42 engages the bottom or solid collecting surface 18 of the tank 10 when moving in a direction toward the sludge hopper 16 and means are provided to elevate the scraper flight when the carriage is being moved in a direction away from the hopper 16. A preferred manner of providing the means to elevate the scraper flight 42 is the provision of the lifter links 46 which are pivotly secured at their lower ends to the projecting lugs 48 disposed at the upper ends of the lower carrier arms 40. The upper ends of the lifter links 46 are pivotly secured to the lifter arms 50 which extend outwardly and forwardly from the sleeve 52 which is rotatively secured about the main axle 22. Thus, rotation of the sleeve 52 about the axle 22 will effect a raising or lowering motion to the lower carrier arms 40 by means of the upward or downward movement of the lifter arms 50. As illustrated, the lifter arms 46 generally extend upwardly and forwardly, in the direction of scraping movement, but these arms are bowed slightly backwardly adjacent their upper portions to effect a gravity lock in elevated position, as best seen in Fig. 2.

In order that the rotating sleeve 52 may be rotated to elevate or lower the scraper flight 42, a rotator arm 54 is rigidly secured to the rotating sleeve 52 and extends generally upwardly and forwardly therefrom at a desired angle. The rotator arm is engaged by the rotator stop 56 positioned at the end of the tank proximate the hopper 16, and which rotator stop extends in the direction of the rotator arm and engages the rotator arm as it moves toward that end of its scraping flight.

As best seen in Fig. 6, the rotator arm 54 has a socket member 58 which engages the ball member 60 disposed at the extending end of the rotator stop 56. Thus, a ball and socket action is provided as the rotator arm 54 engages the rotator stop 56, the continued movement of the rotator arm forwardly effecting a rotation of the sleeve 52 and thereby elevating the lower carrier arms 40 and the flight 42.

At the other end of the tank or basin 10 a reverse rotator stop 62 is provided which engages the back of the rotator arm 54, thereby tilting the rotator arm, breaking the gravity lock and permitting the lower carrier arms and flight to drop to the position shown in Fig. 1.

Means are provided to reciprocate the carriage and scraper flight along the tank and, as illustrated, a prime mover, generally indicated by the numeral 64 is provided, which may be of the reversible motor-reducer drive unit type. While any preferred drive linkage may be provided, for the purpose of illustration, the drive shaft 66 of the prime mover 64 has provided thereon the spaced sprocket wheels 68 which engage and drive the chains 70 located at the upper surface of the tank walls. The endless drive chains 70 engage the sprocket wheels 72 secure to the axle 74 at the opposite end of the tank or basin 10. As illustrated, the upper travel of the drive chain 70 is held clear of the carriage by means of the chain coaster wheels 76 secured to the upper end of the chain spacing arms 78 extending upwardly from the upper sides of the tank or basin 10.

The carriage 20 is secure to the lower travel of the drive chains 70 and as indicated are secured to the axles 22 and 24. Thus, the carriage 20 is moved by means of the drive chains 70.

Means may be provided to automatically reciprocate the carriage 20 along the top 30 of the tank or basin 10 and, as best seen in Fig. 4, a conventional snap-type switch 80 is provided, which is so arranged and wired in the motor circuits that in the center or neutral position the power circuit is open and no current reaches the motor. In the up or forward position, as illustrated in Figure 4, the current through the motor fields is such to cause a clockwise rotation, and in the down or reverse position, the field current is such to cause counter-clockwise rotation. As best seen in Figs. 2 and 3 a pair of lugs 82 and 84 are spaced in one of the drive chains 70, these lugs extending laterally and engaging the handle 86 on the snap-switch 80, as best seen in Figs. 4 and 5. Thus, as the lug 82 engages the handle 86, and pushes the handle to the snap position, the motor will be cut off and any rotation will be due to the coasting of the carriage, preferably the device coasting until the switch reaches the lower snap point and the motor starts driving in the reverse direction. The purpose of the neutral or coast operation is to prevent instant reversal of the motor which would be damaging thereto. Thus, the chain is driven reversely until such time as the lug 84 engages the handle 86 of the switch 80 which reverses the operation described. The lugs are so positioned in the driving chain so that reversal occurs just prior to the time the scraper flight 42 approaches the edge of the sump 16 and just before the scraper flight 42 reaches the other end of the tank 10.

It seems apparent that the lugs 84 and 86 may conveniently be spaced or respaced in adapting or adjusting the apparatus for use with tanks and basins of varied size and shape.

In operation influent having suspended solids enters the inlet port 12, the solids or sediment settling to the bottom or sediment collecting surface 18 of the tank 10, the effluent leaving the tank by the outlet port 14. The carriage 20 is reciprocated along the tank top by means of the motor 64 driving the driving chains 70 which are secured to the carriage 20. As the carriage and scraper flight is driven forwardly or toward the sump or sludge hopper 16, it is in a lowermost position and engages the bottom or solid collecting surface 18 thereby moving the solids toward the hopper 16. Upon approaching the hopper 16 the rotator arm 54 engages the rotator stop 56 elevating the latter and thereby rotating the sleeve 52, which elevates the scraper flight 42 as seen in Fig. 2. As indicated, the slight bow at the upper portions of the arms 46 effect a gravitational lock which maintains the carriage and associated parts in the upper position indicated in Fig. 2 during reverse movement of the carriage. Substantially simultaneously with the elevation of the scraper flight 42 the lug 82 engages the handle 86 of the snap-switch 80 to effect a reversal of the motor, thereby moving the carriage and associated parts or reciprocating it toward the opposite end. As the carriage 20 and associated parts approach the opposite end, the rotator arm 54 is engaged by the rotator stop 62 which moves the arm 54 forwardly thereby rotating the sleeve 52 forwardly to a point where the gravitational lock of the arms 46 is overcome and, by gravity, the carrier flight 42 assumes the lower position as indicated in Figs. 1 and 3. Substantially simultaneously therewith the lug 84 engages the handle 86 of the snap-switch 80 from the side opposite to that which the lug 84 engaged, thereby effecting a reversal of the motor 64 in the manner indicated. The scraper flight 42 is thus in scraping or solid-moving position and moves toward the hopper or sump 16. The cycle is automatically repeated as the carriage and scraper flight reciprocate along the tank 10 and solids may be removed from the hopper 16 in any desired or conventional manner, such as by gravity flow through a pipe (not shown) at the bottom of the hopper 16.

It will be understood that the invention is not limited to the specific features and construction herein described, but can be embodied in other forms without departure from the spirit of the invention as defined by the claims. For example, while a single scraper flight is illustrated and described for the purpose of disclosure, several of such flights may be used to scrape sediment or sludge into several sludge hoppers or sumps. In addition, any type of reversing means for the flight may be utilized and the invention may be adapted for use with any type of sediment or sludge settling tank.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

What is claimed is:

1. Apparatus for separating solids from liquids in settling tanks and the like comprising, a carriage reciprocal along the tank, means for reciprocating the carriage along the tank, a sleeve rotatably secured to the carriage, spaced arms extending downwardly from such carriage, carrier arms telescopically secured to the lower portion of such first mentioned arms, such carrier arms adapted to telescope longitudinally of such first mentioned arms, a scraper flight secured to the lower portion of such carrier arms and adapted to scrape solids settled on the bottom of the tank, a pair of arms rigidly secured to and extending forwardly from such sleeve, links pivotally secured to and extending upwardly and forwardly from said carrier arms and pivotally secured to free ends of such pair of arms, such links being bowed backwardly thereby providing a gravitational lock when the pair of arms are extending upwardly in substantially vertical position, and means on such sleeve engageable by means disposed at each end of the tank to rotate the sleeve at one end of the tank in one direction for raising such pair of arms to a substantially vertical position and at the other end of the tank in the other direction for lowering such pair of arms thereby raising and lowering the scraper flight.

2. Apparatus for separating solids from liquids in settling tanks and the like comprising, a carriage reciprocal along the tank, means for reciprocating the carriage along the tank, a sleeve rotatably secured to the carriage, spaced arms extending downwardly from such carriage, carrier arms slidably secured to the lower portion of such first mentioned arms, such carrier arms adapted to slide longitudinally of such first mentioned arms, a scraper flight secured to the lower portion of such carrier arms and adapted to scrape solids settled on the bottom of the tank, a pair of arms rigidly secured to and extending forwardly from such sleeve, links pivotally secured to and extending upwardly and forwardly from said carrier arms and pivotally secured to free ends of such pair of arms, such links being bowed backwardly at their upper portions thereby providing a gravitational lock when the pair of arms are extending upwardly in substantially vertical position, and means on such sleeve engageable by means disposed at each end of the tank to rotate the sleeve at one end of the tank in one direction for raising such pair of arms to substantially vertical position and at the other end of the tank in the other direction for lowering such pair of arms thereby raising and lowering the scraper flight.

3. The apparatus of claim 2 where the means for reciprocating the carriage along the tank is positioned at the top of the tank.

4. The apparatus of claim 2 where the means for reciprocating the carriage along the tank includes a chain drive positioned along the top of the tank and secured to the carriage.

5. The apparatus of claim 2 where the means for reciprocating the carriage along the tank includes a prime mover, a chain drive driven by the prime mover, such chain drive positioned along the top of the tank and secured to the carriage, a snap switch for automatically reversing the prime mover, and spaced lugs on such chain drive adapted to engage the snap switch for automatically reversing the prime mover and thereby the chain drive for reciprocating the carriage along the tank.

6. The apparatus of claim 5 where the snap switch is so arranged and wired in the motor circuits of the prime mover that in the neutral position the power circuit is open and no current reaches the motor whereby upon one of the lugs first engaging the snap switch the snap switch will be moved to neutral position, coasting of the carriage causing the lug to move the snap switch from the neutral position to reverse position for reversing the prime mover.

7. Apparatus for separating solids from liquids in settling tanks and the like comprising, a carriage reciprocal along the tank, means for reciprocating the carriage along the tank, a sleeve rotatably secured to the carriage, spaced arms extending downwardly from such carriage, carrier arms slidably secured to the lower portion of such first-mentioned arms, such carrier arms adapted to slide longitudinally of such first-mentioned arms, a scraper flight secured to the lower portion of such carrier arms and adapted to scrape solids settled on the bottom of the tank, a pair of arms rigidly secured to and extending forwardly from such sleeve, links pivotally secured to and extending upwardly and forwardly from said carrier arms and pivotally secured to free ends of such pair of arms, and means on such sleeve engageable by means disposed at each end of the tank to rotate the sleeve at one end of the tank in one direction for raising such pair of arms to substantially vertical position and at the other end of the tank in the other direction for lowering such pair of arms thereby raising and lowering the scraper flight.

8. The apparatus of claim 7 where the engageable means of the sleeve and the means disposed at each end of the tank to rotate the sleeve comprise ball and socket elements.

RICHARD L. KNOWLTON.

References Cited in the file of this patent

UNITED STATES PATENTS

| Number | Name | Date |
|---|---|---|
| 1,911,008 | Withington | May 23, 1933 |
| 2,033,291 | Laughlin et al. | Mar. 10, 1936 |
| 2,099,654 | Lund | Nov. 16, 1937 |
| 2,101,081 | Lund | Dec. 7, 1937 |

FOREIGN PATENTS

| Number | Country | Date |
|---|---|---|
| 523,422 | Great Britain | July 15, 1940 |